United States Patent
Lindau et al.

(10) Patent No.: US 7,524,473 B2
(45) Date of Patent: Apr. 28, 2009

(54) METHOD OF MERCURY REMOVAL IN A WET FLUE GAS DESULFURIZATION SYSTEM

(75) Inventors: Leif A. V. Lindau, Arlov (SE); Fredrik J. Brogaard, Vaxjo (SE)

(73) Assignee: Alstom Technology Ltd, Baden (CH)

( * ) Notice: Subject to any disclaimer, the term of this patent is extended or adjusted under 35 U.S.C. 154(b) by 213 days.

(21) Appl. No.: 11/726,804

(22) Filed: Mar. 23, 2007

(65) Prior Publication Data

US 2008/0233024 A1 Sep. 25, 2008

(51) Int. Cl.
- B01D 53/50 (2006.01)
- B01D 53/64 (2006.01)
- B01D 53/74 (2006.01)
- G05B 1/00 (2006.01)
- G05D 21/00 (2006.01)

(52) U.S. Cl. ............ 423/210; 423/243.08; 423/244.07; 423/244.08; 423/DIG. 5; 422/105; 422/108; 422/110; 422/111; 422/168

(58) Field of Classification Search ............ 423/210, 423/243.08, 244.07, 244.08, DIG. 5; 422/105, 422/108, 110, 111, 168

See application file for complete search history.

(56) References Cited

U.S. PATENT DOCUMENTS

| | | | |
|---|---|---|---|
| 6,029,100 A | 2/2000 | Iwashita et al. | |
| 7,407,602 B2 * | 8/2008 | Hurley | 252/182.11 |
| 2004/0013589 A1 | 1/2004 | Vosteen et al. | |
| 2007/0202020 A1 * | 8/2007 | Honjo et al. | 422/177 |

FOREIGN PATENT DOCUMENTS

| | | |
|---|---|---|
| WO | 95/33547 | 12/1995 |
| WO | 96/14137 | 5/1996 |

* cited by examiner

*Primary Examiner*—Timothy C Vanoy
(74) *Attorney, Agent, or Firm*—Wiggin and Dana LLP; Anthony P. Gangemi

(57) ABSTRACT

Controlling the reductive capacity of an aqueous alkaline slurry (23) in a wet scrubber makes it possible to accurately control the mercury emission from the scrubber to a desired value. One method of controlling the reductive capacity of the slurry is to measure the reduction-oxidation potential ("redox potential") of the aqueous alkaline slurry (23) and to add or remove substances that affect the redox potential and thus the reductive capacity of the slurry. In wet scrubbers in which limestone is used for absorption of acid gases and where a gypsum slurry is circulated, it has been found to be an attractive solution to control the amount of oxidation air blown into the scrubber in order to control the redox potential and thereby the mercury emissions.

19 Claims, 1 Drawing Sheet

METHOD OF MERCURY REMOVAL IN A WET FLUE GAS DESULFURIZATION SYSTEM

BACKGROUND (1) Field

The disclosed subject matter generally relates to controlling an amount of mercury discharged to an environment incident to the combustion of a fuel source containing mercury or mercury compounds, and more particularly to controlling the mercury discharge in a combustion flue gas which is subjected to a wet scrubbing operation.

(2) Description of the Related Art

Combustion of fuel sources such as coal produces a waste gas, referred to as "flue gas" that is to be emitted into an environment, such as the atmosphere. The fuel sources typically contain sulfur and sulfur compounds which are converted in the combustion process to gaseous species, including sulfur oxides, which then exist as such in the resulting flue gas. The fuel sources typically also contain elemental mercury or mercury compounds which are converted in the combustion process to, and exist in the flue gas as, gaseous elemental mercury or gaseous ionic mercury species.

Accordingly, flue gas contains particles, noxious substances and other impurities that are considered to be environmental contaminants. Prior to being emitted into the atmosphere via a smoke stack ("stack"), the flue gas undergoes a cleansing or purification process. In coal combustion, one aspect of this purification process is normally a desulfurization system, such as a wet scrubbing operation known as a wet flue gas desulfurization (WFGD) system.

Sulfur oxides are removed from flue gas using a WFGD system by introducing an aqueous alkaline slurry to a scrubber tower of the WFGD system. The aqueous alkaline slurry typically includes a basic material that will interact with contaminants to remove them from the flue gas. Examples of basic materials that are useful in the aqueous alkaline slurry include, but are not limited to: lime, limestone, magnesium, calcium sulfate, and the like, and combinations thereof.

Recently, there has been an increased focus on the removal of mercury. Presently, there are various methods for removing mercury from flue gas. Those methods include, but are not limited to: addition of oxidizing agents in a boiler upstream of the flue gas emission control system and then removing it with scrubbers; addition of reactants to bind mercury and remove it from the flue gas; and utilization of particular coal or fuel that minimizes the amount of mercury released when the coal or fuel is burned.

It has been shown that a number of generally known methods of mercury removal are effective to produce mercury salts, which can be dissolved and removed by the aqueous alkaline slurry used in the wet scrubbing operation. Some of these methods include the addition of halogen or halogen compounds, such as bromine, to the coal or to the flue gas upstream of the wet scrubbing operation, to provide oxidation of elemental mercury to ionic mercury and formation of mercury salts, which are then dissolved in the aqueous alkaline slurry incident to the sulfur oxide removal processes. However, the removal of mercury in the aqueous alkaline slurry of a wet scrubber has proven to be difficult to control and it is not easily predicted when designing a flue gas cleaning system with respect to mercury removal. The desired emission guarantee levels are often as low as 1 mg/Nm$^3$ of mercury, which corresponds to a very high mercury removal efficiency in the wet scrubber.

BRIEF SUMMARY

One aspect of the disclosed subject matter relates to a method for controlling an amount of mercury discharged to an environment in a flue gas generated by combustion of a fuel source. The method includes subjecting the flue gas to a wet scrubbing operation to decrease an amount of sulfur oxides present in the flue gas, the wet scrubbing operation comprising contacting the flue gas with an aqueous alkaline slurry to absorb the sulfur oxides from the flue gas, wherein at least a portion of gaseous ionic mercury species present in the flue gas are dissolved in the aqueous alkaline slurry and thereby removed from the flue gas, measuring a redox potential of the aqueous alkaline slurry used in the wet scrubbing operation to provide a signal indicative of the measured redox potential and adjusting the redox potential of the aqueous alkaline slurry used in the wet scrubbing operation in response to the signal, thereby controlling the amount of ionic mercury present in flue gas that can be reduced to elemental mercury by the slurry.

Another aspect of the disclosed subject matter relates to a method for controlling an amount of mercury discharged to an environment in a flue gas generated by combustion of a fuel source. The method includes subjecting the flue gas to a wet scrubbing operation to decrease an amount of sulfur oxides present in the flue gas, the wet scrubbing operation includes contacting the flue gas with an aqueous alkaline slurry to absorb the sulfur oxides from the flue gas, wherein at least a portion of gaseous ionic mercury species present in the flue gas are dissolved in the aqueous alkaline slurry and thereby removed from the flue gas. Measuring an amount of gaseous elemental mercury emitted from a scrubber tower to provide a signal indicative of the measured amount of gaseous elemental mercury and adjusting a redox potential of the aqueous alkaline slurry used in the wet scrubbing operation using the signal, thereby controlling the amount of ionic mercury present in flue gas that can be reduced to elemental mercury by the slurry.

Another aspect of the disclosed subject matter relates to a system for controlling an amount of mercury discharged to an environment in a flue gas generated by combustion of a fuel source. The system includes a scrubbing tower in which the flue gas is subjected to an aqueous alkaline slurry to decrease an amount of sulfur oxides present in the flue gas, wherein at least a portion of gaseous ionic mercury species present in the flue gas are dissolved in the aqueous alkaline slurry and thereby removed from the flue gas, the scrubbing tower includes a collecting tank to collect the aqueous alkaline slurry used in the wet scrubbing operation. A measuring device coupled to the collecting tank and configured to provide a signal indicative of a redox potential of the aqueous alkaline slurry used in the wet scrubbing operation and means for adjusting the redox potential of the aqueous alkaline slurry used in the wet scrubbing operation in response to the signal, thereby controlling the amount of ionic mercury present in flue gas that can be reduced to elemental mercury by the slurry.

The details of one or more embodiments are set forth in the accompanying drawing and the description below. Other features, objects and advantages will be apparent from the description and drawing, and from the claims.

BRIEF DESCRIPTION OF THE DRAWINGS

For the purpose of illustrating the subject matter disclosed herein, the drawing shows a form of the embodiments that is presently preferred. However, it should be understood that the disclosed subject matter is not limited to the precise arrangements and instrumentalities shown in the drawing, wherein.

DETAILED DESCRIPTION

Figure 1:
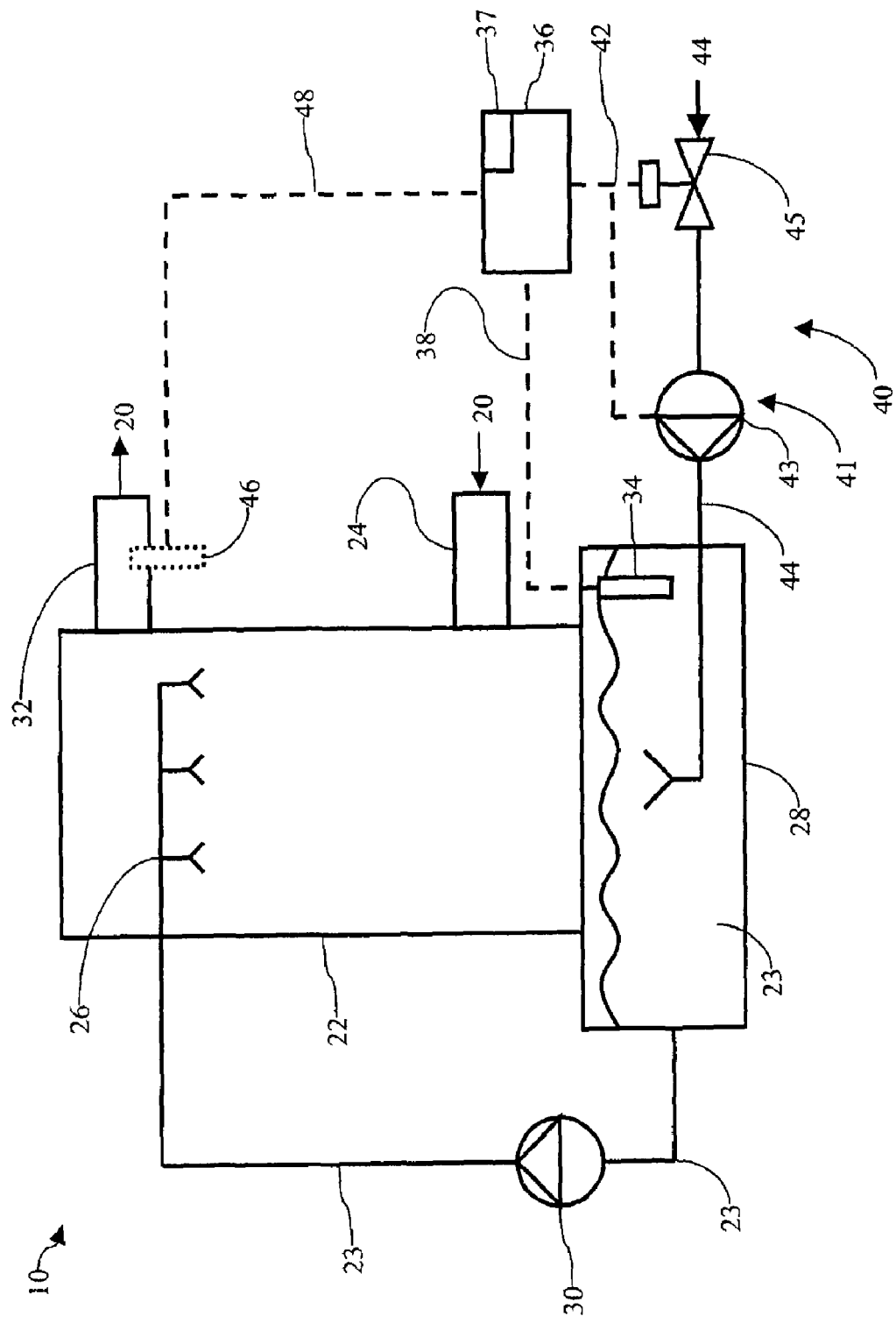
FIG. 1 is a schematic representation of a system for controlling an amount of gaseous elemental mercury emitted by a flue gas, which is practiced using a wet scrubber.

The present inventors have discovered that controlling the reductive capacity of an aqueous alkaline slurry in a wet scrubber makes it possible to accurately control the mercury emission from the scrubber to a desired value. As used herein, the "reductive capacity" is the amount of ionic mercury present in flue gas that can be reduced to elemental mercury by the slurry. One method of controlling the reductive capacity of the slurry is to measure the reduction-oxidation potential ("redox potential") of the aqueous alkaline slurry and to add or remove substances that affect the redox potential and thus the reductive capacity of the slurry. In wet scrubbers in which limestone is used for absorption of acid gases and where a gypsum slurry is circulated, it has been found to be an attractive solution to control the amount of oxidation air blown into the scrubber in order to control the redox potential and thereby control the mercury emissions. If it is desired to increase the emission of mercury the amount of oxidation air is controlled to a lower amount, which results in a lower redox potential and a higher emission of mercury. If, on the other hand, the mercury emission becomes too high, the amount of oxidation air is controlled to a higher amount, which results in a higher redox potential and a lower emission of mercury. In this manner, it is possible to stay below a maximum allowed emission of mercury with a minimum consumption of oxidation air. Further the emission of mercury becomes controllable and predictable such that a guarantee for mercury emission value can be based on the capability of removing mercury in the scrubber.

Referring now to FIG. 1, one example of a system for controlling an amount of gaseous elemental mercury emitted by a flue gas, which is practiced using a wet scrubbing operation, is shown generally at 10. In system 10, a flue gas 20 travels from a combustion source, such as a coal-fired boiler, and enters a scrubber tower 22 through inlet 24. While scrubber tower 22 is shown in one form, it is contemplated that other forms of scrubber towers can be used in conjunction with the present invention.

Once inside scrubber tower 22, flue gas 20 comes into contact with, among other things, an aqueous alkaline slurry 23 to remove contaminants from the flue gas 20. Aqueous alkaline slurry 23 is introduced to the flue gas 20 via an inlet 26 (e.g., one or more nozzles) in scrubber tower 22. As described above, aqueous alkaline slurry 23 removes sulfur oxides from flue gas 20. Removal of mercury salts is incident to this sulfur oxide removal process. The cleansed flue gas 20 is released from scrubber tower 22 at outlet 32, where the flue gas 20 may flow to a stack or other emissions control apparatus.

Aqueous alkaline slurry 23 is transported to scrubber tower 22 from collecting tank 28 via one or more pumps 30. The amount of aqueous alkaline slurry 23 transported to scrubber tower 22 varies depending on several factors, including, but not limited to: the amount of flue gas 20 present in the scrubber tower, the amount of contaminants in the flue gas 20, and the design of the system 10. After aqueous alkaline slurry 23 contacts flue gas 20 and removes contaminants therefrom, the aqueous alkaline slurry 23 is collected in collecting tank 28 for recirculation to inlet 26 by pump 30.

To control the mercury emission from the scrubber tower 22, a measurement device 34 (e.g., a probe) measures the redox potential of the aqueous alkaline slurry 23 in the collecting tank 28. Measurement device 34 can be any device capable of measuring the redox potential of aqueous alkaline slurry 23 present in collecting tank 28. Examples of measurement devices include dissolved oxygen analyzers, and probes. Measurement device 34 may measure the redox potential of aqueous alkaline slurry 23 in collecting tank 28 either continuously or at predetermined intervals. For example, the predetermined intervals may be determined automatically by a control device 36, which is in communication with the measurement device 34, or manually by a user.

After measuring the redox potential of aqueous alkaline slurry 23, measurement device 34 provides a signal 38 indicative of the measured redox potential to control device 36. Control device 36 may include, for example, a computer, a microprocessor, an application specific integrated circuit, circuitry, or any other device that can transmit and receive electrical signals from various sources, at least temporarily store data indicated by such signals, and perform mathematical and/or logical operations on the data indicated by such signals. Control device 36 may include or be connected to a monitor, a keyboard, or other user interface, and includes an associated memory device 37.

Control device 36 compares the measured redox potential to one or more predetermined redox potential values, which may be stored in memory device 37. It is contemplated that the one or more predetermined values may comprise a single value or a range of values. The predetermined value(s) may be a user-input parameter. For example, the predetermined redox potential value may be between about 100 milli-volts (mv) and about 600 mv. By "predetermined" it is simply meant that the value is determined before the comparison is made.

Alternatively, the one or more predetermined redox potential values may be determined by the control device 36 in response to output signal 48 from a mercury measurement device 46, which measures the amount of gaseous elemental mercury in flue gas 20 exiting from scrubber tower 22. For example, if the output signal 48 indicates that the emission of mercury is sufficiently low (e.g., below a threshold mercury emission value stored in memory device 37), the control device 36 can lower the predetermined redox potential value, which results in a lower redox potential of aqueous alkaline slurry 23 and, thus, a higher emission of mercury from scrubber tower 22. If, on the other hand, the output signal 48 indicates that the emission of mercury is too high (e.g., above the threshold mercury emission value), the control device 36 can increase the predetermined redox potential value, which results in a higher redox potential and a lower emission of mercury.

Mercury measurement device 46 is any device that is suitable to measure elemental mercury emitted from scrubber tower 22. Examples include, but are not limited to: Continuous Emission Monitors (CEMs), such as cold-vapor atomic absorption spectrometry (CVAAS); cold-vapor atomic fluorescence spectrometry (CVAFS); in-situ ultraviolet differential optical absorption spectroscopy (UVDOAS); and atomic emission spectrometry (AES).

In response to the comparison of the measured redox potential to the one or more predetermined redox potential values, the control device 36 provides a control signal 42 to a means 40 for affecting the reductive capacity of the aqueous alkaline slurry 23. In one embodiment, the means 40 includes a forced oxidation system 41, which adjusts an amount of oxidation air, such as an oxygen containing gas 44, that is introduced into the aqueous alkaline slurry 23 in the collecting tank 28 in response to the control signal 42. Oxygen containing gas 44 can be any gas that contains any amount of oxygen, for example air can be used as the oxygen containing gas. Adjusting the amount of oxygen containing gas 44 introduced to collecting tank 28 adjusts the redox potential of aqueous alkaline slurry 23 present in collecting tank 28.

For example, if the comparison of the measured and predetermined redox potential values reveals that the measured redox potential value is greater than the predetermined redox potential value, control device 36 may provide a control signal 42 to the forced oxidation system 41 to cause the forced oxidation system 41 to decrease the amount of oxygen containing gas 44 being introduced to collecting tank 28. Conversely if the comparison reveals that the actual redox potential value is less than the predetermined redox potential value, the controller may provide a control signal 42 to the forced oxidation system 41 to cause the forced oxidation system 41 to increase the amount of oxygen containing gas 44 being introduced to collecting tank 28. In this manner, it is possible to limit the emission of mercury at the flue gas outlet 32, while minimizing the consumption of oxygen containing gas. It is contemplated that the control device 36 may employ known control algorithms (e.g., proportional, integral, and/or derivative control algorithms) to adjust the control signal 42 in response to the comparison of the measured and predetermined redox potential values.

Forced oxidation system 41 may employ a blower 43 of any suitable type, which can introduce oxygen containing gas 44 into aqueous alkaline slurry 23 present in collecting tank 28. In the example shown, forced oxidation system 41 includes an inlet vane 45 which operates to regulate the amount of oxygen containing gas 44 entering the blower 43 in response to the control signal 42 from the controller 36. While the inlet vane 45 is a suitable device for regulating the amount of gas 44 delivered to the tank 28, other types of devices and methods could be employed, such as a valve downstream of the blower 43, or by controlling the speed of the blower 43. Alternatively, spargers, air lance agitators and aspirators may be employed instead of a blower 43. Additionally, forced oxidation system 41 may be connected to an agitator (not shown) in collecting tank 28, which assists in distributing oxygen containing gas 44 throughout aqueous alkaline slurry 23.

Although the subject matter has been described and illustrated with respect to exemplary embodiments thereof, it should be understood by those skilled in the art that the foregoing and various other changes, omissions and additions may be made therein and thereto, without parting from the spirit and scope of the disclosed method and system. Accordingly, other embodiments are within the scope of the following claims.

What is claimed is:

1. A method for controlling an amount of mercury discharged to an environment in a flue gas generated by combustion of a fuel source, said method comprising:
    subjecting said flue gas to a wet scrubbing operation to decrease an amount of sulfur oxides present in said flue gas, said wet scrubbing operation comprising contacting said flue gas with an aqueous alkaline slurry to absorb said sulfur oxides from said flue gas, wherein at least a portion of gaseous ionic mercury species present in said flue gas are dissolved in said aqueous alkaline slurry and thereby removed from the flue gas;
    measuring a redox potential of the aqueous alkaline slurry used in the wet scrubbing operation to provide a signal indicative of the measured redox potential; and
    controlling the amount of ionic mercury present in flue gas that can be reduced to elemental mercury by the slurry by adjusting the redox potential of the aqueous alkaline slurry used in the wet scrubbing operation in response to the signal.

2. The method of claim 1, wherein said aqueous alkaline slurry comprises at least one of: lime, limestone and calcium sulfate.

3. The method of claim 1, wherein adjusting the redox potential of the aqueous alkaline slurry comprises:
    comparing the measured redox potential of said aqueous alkaline slurry to a predetermined redox potential.

4. The method of claim 3, further comprising:
    measuring an amount of gaseous elemental mercury emitted from a scrubber tower to provide a signal indicative of the measured amount of gaseous elemental mercury; and
    determining the predetermined redox potential in response to the signal indicative of the measured amount of gaseous elemental mercury.

5. The method of claim 3, wherein the predetermined redox potential is between about 100 mv and about 600 mv.

6. The method of claim 1, wherein the predetermined redox potential is part of a range of predetermined redox potential values.

7. The method of claim 1, wherein adjusting the redox potential of the aqueous alkaline slurry comprises:
    adjusting an amount of oxygen containing gas introduced to said aqueous alkaline slurry, wherein said oxygen containing gas affects the redox potential of said aqueous alkaline slurry.

8. The method of claim 1, wherein adjusting the redox potential of the aqueous alkaline slurry comprises:
    measuring an amount of gaseous elemental mercury emitted from a scrubber tower to provide a signal indicative of the measured amount of gaseous elemental mercury;
    determining a redox potential value in response to the signal indicative of the measured amount of gaseous elemental mercury to provide a predetermined redox potential;
    comparing the measured redox potential of said aqueous alkaline slurry to the predetermined redox potential; and
    adjusting an amount of oxygen containing gas introduced to said aqueous alkaline slurry in response to the comparison of the measured redox potential of said aqueous alkaline slurry to the predetermined redox potential, wherein said oxygen containing gas affects the redox potential of said aqueous alkaline slurry.

9. A method for controlling an amount of mercury discharged to an environment in a flue gas generated by combustion of a fuel source, said method comprising:
    subjecting said flue gas to a wet scrubbing operation to decrease an amount of sulfur oxides present in said flue gas, said wet scrubbing operation comprising contacting said flue gas with an aqueous alkaline slurry to absorb said sulfur oxides from said flue gas, wherein at least a portion of gaseous ionic mercury species present in said flue gas are dissolved in said aqueous alkaline slurry and thereby removed from the flue gas;
    measuring an amount of gaseous elemental mercury emitted from a scrubber tower to provide a signal indicative of the measured amount of gaseous elemental mercury; and
    adjusting a redox potential of the aqueous alkaline slurry used in the wet scrubbing operation using the signal, thereby controlling the amount of ionic mercury present in flue gas that can be reduced to elemental mercury by the slurry.

10. The method of claim 9, wherein said aqueous alkaline slurry comprises at least one of: lime, limestone and calcium sulfate.

11. The method of claim 9, wherein adjusting the redox potential of the aqueous alkaline slurry comprises:
   determining a redox potential value in response to the signal indicative of the measured amount of gaseous elemental mercury to provide a predetermined redox potential;
   measuring a redox potential of the aqueous alkaline slurry used in the wet scrubbing operation;
   comparing the measured redox potential of said aqueous alkaline slurry to the predetermined redox potential; and
   adjusting an amount of oxygen containing gas introduced to said aqueous alkaline slurry in response to the comparison of the measured redox potential of said aqueous alkaline slurry to the predetermined redox potential, wherein said oxygen containing gas affects the redox potential of said aqueous alkaline slurry.

12. The method of claim 11, wherein the predetermined redox potential is part of a range of predetermined redox potential values.

13. A system for controlling an amount of mercury discharged to an environment in a flue gas generated by combustion of a fuel source, said system comprising:
   a scrubbing tower in which the flue gas is subjected to an aqueous alkaline slurry to decrease an amount of sulfur oxides present in said flue gas, wherein at least a portion of gaseous ionic mercury species present in said flue gas are dissolved in the aqueous alkaline slurry and thereby removed from the flue gas, the scrubbing tower including a collecting tank to collect the aqueous alkaline slurry used in the wet scrubbing operation;
   a measuring device coupled to the collecting tank and configured to provide a signal indicative of a redox potential of the aqueous alkaline slurry used in the wet scrubbing operation; and
   a means for controlling the amount of ionic mercury present in the flue gas that can be reduced to elemental mercury by the slurry, whereby the redox potential of the aqueous alkaline slurry used in the wet scrubbing operation is adjusted in response to the signal.

14. The system of claim 13, wherein said aqueous alkaline slurry comprises at least one of: lime, limestone and calcium sulfate.

15. The system of claim 13, wherein the means for controlling the amount of ionic mercury present in the flue gas that can be reduced to elemental mercury by the slurry includes:
   a forced oxidation system coupled to the collecting tank; and
   a controller configured to adjust an amount of oxygen containing gas introduced to the collecting tank by the forced oxidation system in response to the signal.

16. The system of claim 15, wherein the controller is further configured to compare of the measured redox potential of said aqueous alkaline slurry to a predetermined redox potential and provide a control signal to the forced oxidation system in response to the comparison.

17. The system of claim 16, further comprising:
   a mercury measurement device coupled to a flue gas outlet of the scrubbing tower and configured to provide a signal indicative of an amount of gaseous elemental mercury emitted from the scrubber tower; and
   wherein the controller is further configured to determine the predetermined redox potential in response to the signal indicative of an amount of gaseous elemental mercury emitted from the scrubber tower.

18. The system of claim 16, wherein the predetermined redox potential is between about 100 mv and about 600 mv.

19. The system of claim 16, wherein the controller is further configured to determine the predetermined redox potential using at least one of boiler load and coal quality.

* * * * *